United States Patent [19]
Kotzin et al.

[11] Patent Number: 5,301,188
[45] Date of Patent: * Apr. 5, 1994

[54] SHARED-CARRIER FREQUENCY HOPPING

[75] Inventors: Michael D. Kotzin, Buffalo Grove; Stephen L. Spear, Skokie, both of Ill.

[73] Assignee: Motorola, Inc., Schaumburg, Ill.

[ * ] Notice: The portion of the term of this patent subsequent to Oct. 26, 2000 has been disclaimed.

[21] Appl. No.: 927,792

[22] Filed: Aug. 10, 1992

Related U.S. Application Data

[63] Continuation of Ser. No. 486,047, Feb. 27, 1990, abandoned.

[51] Int. Cl.⁵ ............................... H04J 4/00
[52] U.S. Cl. ..................... 370/50; 370/95.1; 379/59; 455/33.1
[58] Field of Search ........... 370/50, 95.1, 95.3; 379/59, 60; 455/49, 32.1, 33.1-33.4, 34.1, 56.1, 54.1; 380/33; 375/1

[56] References Cited

U.S. PATENT DOCUMENTS

| | | | |
|---|---|---|---|
| 4,144,496 | 3/1979 | Cunningham | 325/53 |
| 4,425,639 | 1/1984 | Acampora et al. | 370/95.1 |
| 4,578,815 | 3/1986 | Persinotti | 455/15 |
| 4,667,202 | 5/1987 | Kammerlander et al. | 455/56 |
| 4,669,107 | 5/1987 | Eriksson-Lennartsson | 379/60 |
| 4,677,617 | 6/1987 | O'Connor et al. | 370/50 |
| 4,866,710 | 9/1989 | Schaeffer | 370/50 |
| 4,879,711 | 11/1989 | Rosen | 370/50 |
| 4,955,082 | 9/1990 | Hattori et al. | 370/95.1 |
| 4,979,170 | 12/1990 | Gilhousen et al. | 455/32.1 |
| 5,040,238 | 8/1991 | Comroe et al. | 455/33 |
| 5,079,768 | 1/1992 | Flammer | 375/1 |

Primary Examiner—Douglas W. Olms
Assistant Examiner—Dang Ton
Attorney, Agent, or Firm—Richard A. Sonnentag

[57] ABSTRACT

In a TDMA cellular network, there is provided a mechanism for shared-carrier frequency-hopping. It comprises: allocating on a frame basis within a reuse diameter to one coverage area during certain timeslot(s) at least one from a pool of TDM-frame-hopped carriers and allocating on a frame basis within that carrier reuse diameter to another coverage area during certain other, substantially non-overlapping timeslot(s) that frame-hopped carrier, all in substantially non-interfering time-synchronism with any proximal reuse of that carrier, whereby the advantages of frequency hopping are obtained. Stated differently, it comprises: at one instant in time, allocating within a reuse diameter to one coverage area at least one of a plurality of hopped carriers and at that same instant in time, allocating within that carrier reuse diameter to another coverage area another of that plurality of hopped carriers, all in time-synchronism with any proximal reuse of that carrier. The control and access carriers may also be included in the hopping pool, causing certain timeslots to be hopped on a sequence different from the others. The pool of hopped carriers is further apportioned among co-located sites into hopping groups, thereby reducing intra-system synchronization requirements. To solve the near/far problem, TDM timeslots bordering hopping boundaries are preferentially allocated to less distant mobile users.

22 Claims, 1 Drawing Sheet

SHARED-CARRIER FREQUENCY HOPPING

This is a continuation of application Ser. No. 07/486,047, filed Feb. 27, 1990 and now abandoned.

THE FIELD OF INVENTION

This invention is concerned with frequency hopping.

More particularly, in a cellular radiotelephone system, this invention is concerned with increasing carrier availability for hopping through the employment of various carrier sharing techniques.

BACKGROUND OF THE INVENTION

Geographic reuse of carrier frequencies has proliferated as a viable solution to the problem of limited radio spectrum in cellular radiotelephone systems. Traditionally, a served area is subdivided into clusters of cellular coverage areas which have allocated to them groups of carriers. These clusters are repeated such that carriers reused from cluster to cluster are sufficiently geographically separated from one another to permit simultaneous reuse of carriers without undo interference.

Frequency hopping might be employed to provide sensitivity improvement against slow fading and to improve carrier-to-interference (C/I) margin in cellular radiotelephone systems. Transmissions within a given coverage area would be hopped from one carrier within the group allocated to that coverage area to another within the group, hopping from one to another. However, there must be a sufficient number of carriers in each coverage area over which to hop or the advantages of frequency hopping are diminished. In other words, both less dense cellular reuse and greater frequency hopping improve the performance in a given coverage area, but both usually draw from the very same (and scarce) spectrum. So, whatever is gained by one technique is gained at the expense of the other.

In currently-proposed Time-Division, Multiple Access (TDMA) cellular systems, particularly when utilized as an adjunct to preexisting analog cellular systems or where more than one operator coexist, fewer carriers are available to be employed, or are required for that matter, because up to eight conversations take place in eight repeating timeslots on a single carrier. Accordingly, up to seven-eighths fewer carriers are required to carry the same channel capacity. This reduction in carriers available to each coverage area reduces the opportunity for employing frequency hopping as an effective system enhancement.

This invention takes as its object to overcome these shortcomings and to realize certain advantages presented below.

SUMMARY OF THE INVENTION

In a TDMA cellular network, there is provided a mechanism for shared-carrier frequency-hopping. It comprises: allocating on a frame basis within a reuse diameter to one coverage area during certain timeslot(s) at least one from a pool of TDM-frame-hopped carriers and allocating on a frame basis within that carrier reuse diameter to another coverage area during certain other, substantially non-overlapping timeslot(s) that frame-hopped carrier, all in substantially non-interfering time-synchronism with any proximal reuse of that carrier, whereby the advantages of frequency hopping are obtained. Stated differently, it comprises: at one instant in time, allocating within a reuse diameter to one coverage area at least one of a plurality of hopped carriers and at that same instant in time, allocating within that carrier reuse diameter to another coverage area another of that plurality of hopped carriers, all in time-synchronism with any proximal resue of that carrier. The control and access carriers may also be included in the hopping pool, causing certain timeslots to be hopped on a sequence different from the others. The pool of hopped carriers is further apportioned among co-located sites into hopping groups, thereby reducing intra-system synchronization requirements. To solve the near/far problem, TDM timeslots bordering hopping boundaries are preferentially allocated to less distant mobile users.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

The preferred embodiment of the instant invention recognizes, and then capitalizes upon the inherent divisibility of TDMA carriers and allocates them as shared carriers capable of providing a hopping pool far larger than would be the case according to traditional strategies.

Figure 1:
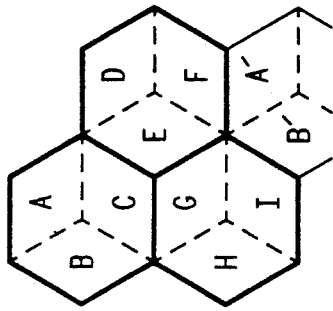
FIG. 1 is a diagram of the network in which the preferred embodiment of the invention operates.

FIG. 1 is a diagram of the network in which the preferred embodiment of the invention operates.

FIG. 1 illustrates nine coverage area (A-I) making up a repeatable cluster in the currently-proposed GSM, Pan-European Digital Cellular (GSM/PEDC) system. Each coverage area is served by a 120 degree sectored antenna. In regions where the full 25 MHz bandwidth is not available (i.e., where more than one operator coexist or where there are preexisting analog cellular systems) a 5 MHz band (of 24 carriers) would be apportioned among the 9 coverage areas, as follows:

| Sector | Carrier Allocation |
| --- | --- |
| A | 1, 10 & 19 |
| B | 2, 11 & 20 |
| C | 3, 12 |
| D | 4, 13 & 21 |
| E | 5, 14 |
| F | 6, 15 & 22 |
| G | 7, 16 |
| H | 8, 17 & 23 |
| I | 9, 18 & 24 |

(Carrier frequencies although numbered sequentially, are not adjacent).

It is recognized that with traditional techniques, hopping would be possible over only the small number of carriers available in each sector (two, or three at most), providing only limited performance improvement over non-hopped systems. Worse yet, one designated carrier frequency in each coverage area is commonly dedicated to system signalling, access and control; and is constantly transmitting and therefore fixedly allocated, further diminishing the carriers available for hopping to one or two per coverage area (or, in the case of TDMA, certain timeslots of the control and access carrier are not available for hopping).

However, if all but the nine dedicated access control channels (1-9) are returned to form a hopping pool, rather than being fixedly allocated to individual coverage areas, the hopping pool increases from one or two per coverage area to fifteen (10-24) per coverage area, provided the hopping sequence is time-synchronized among the individual coverage areas. In other words, instead of allocating a small group of hopping carriers to an individual coverage area within which all hopping must be done, each of the nine coverage areas is allocated a unique time or index offset for sequentially indexing into a circular queue (or otherwise deterministic sequence) having all fifteen, pooled hopping carriers. The hopping is performed in at least rough time-synchronism from sector to sector and from cluster to cluster to avoid same channel (co-channel reuse) interference and adjacent channel interference within the reuse diameter.

The following table illustrates two different schemes for allocating the fifteen carriers in three hopping groups of five each. Note that in X/Y/Z hopping, all fifteen carriers (10-24) are utilized at every co-located sector site (say, A, B, C). This requires greater site-to-site synchronization than U/V/W hopping, where the hopping group (say, U) is comprised of carriers from co-located sectors (i.e., A, B and C) alone, which, in turn, requires less synchronization with non-co-located sites (D/E/F or G/H/I) and lessens the effect of any synchronization failure.

| Sector | Carrier Allocation | U,V,W Hopping | X,Y,Z Hopping |
|---|---|---|---|
| A | 1, 10 & 19 | U: 10–12, 19 & 20 | X: 10, 13, 16, 19 & 21 |
| B | 2, 11 & 20 | U | Y: 11, 14, 17, 20 & 23 |
| C | 3, 12 | U | Z: 12, 15, 18, 22 & 24 |
| D | 4, 13 & 21 | V: 13–15, 21 & 22 | X |
| E | 5, 14 | V | Y |
| F | 6, 15 & 22 | V | Z |
| G | 7, 16 | W: 16–18, 23 & 24 | X |
| H | 8, 17 & 23 | W | Y |
| I | 9, 18 & 24 | W | Z |

The foregoing provides a substantial improvement in noise/interference performance, it is notable that the it occurs only in a fraction (10-24), albeit sizeable fraction, of the total spectrum (1-24). This is due to the dedication of one carrier per coverage area (1-9) which cannot be reused in any other coverage area that is separated by less than the reuse diameter (A and A'). Nevertheless, for improved system performance, hopping carriers 10-24 (rather than fixed carriers 1-9) could be preferentially allocated to those subscribers having the greatest need. Portable, handheld radiotelephone users, due to their slower movement and lower transmit power, would benefit most from improved sensitivity against slow fading and enhanced robustness against interference provided by frequency hopping. Hopping carriers (10-24) might also be preferentially allocated to those experiencing deteriorating signal quality (increasing bit error rate), since that is more indicative of slow fading and interference than signal strength. Although these techniques attempt to optimize the utilization of fixed (1-9) and hopping (10-24) carriers, it would be more desirable to include all carriers (1-24) in the hopping pool.

The foregoing discussion relies fundamentally upon sharing a carrier among various coverage areas synchronously in time, but does not require a slotted TDMA channel structure. But, in fact, GSM/PEDC is a TDMA system; each carrier is subdivided into eight separate channels in a repeating eight-timeslot frame (Slot 0–Slot 7). Slot 0 (and perhaps others) on a designated carrier in each coverage area is reserved and dedicated for access to the system and is, therefore, not available for hopping, but Slots 1-7 are available for other traffic. A further complication is that the designated carrier in each coverage area must constantly be transmitting its dedicated frequency such that its signal strength can be monitored by users in adjacent coverage area for purposes of evaluating handover candidacy, therefore this frequency cannot be reused within the reuse diameter. Unfortunately, reserving Slot 0 of every carrier would result in an unacceptable loss of one-eighth of the available capacity. Reserving one carrier per coverage area that is not part of the hopping pool was the solution proposed in the foregoing discussion, but there is another solution. There could be a different hopping sequence for Slots 1-7 than that of Slot 0. Time Slot 0 could be hopping: . . . abcde abcde . . . , while slots 1-7 would be hopping: . . . abcdef abcdef . . . , where carrier f (and its Slot 0) would be designated for access and control. Thus, Slot 0 of carrier f would always be available for signalling, access and control.

An exemplary eight-slot TDMA system, for one sectored coverage area (say, A), having five hopping carriers (a-e) and one carrier (f) containing Slot 0 for access control and Slots 1-7 that must constantly be transmitting, a slot/carrier allocation for A might be:

```
Slots . . . ||01234567||01234567|to|01234567||01234567||01234567||. . .
A: . . . ||aaaaaaaa||bbbbbbbb||cccccccc|to|dddddddd||eeeeeeee||affffff||baaaaaaa||. . .
Aƒ . . . ||ffffffff||ffffffff||ffffffff|to|ffffffff||ffffffff||f------||ffffffff||. . .
```

Within the reuse separation diameter, carrier f would not be available for hopping, but a-e would. If carrier g were dedicated to, say, coverage area B, an acceptable slot/carrier allocation for B would be:

```
B: . . . ||bbbbbbbb||cccccccc||dddddddd|to|eeeeeeee||aggggggg||baaaaaaa||cbbbbbbb||. . .
Bg: . . . ||gggggggg||gggggggg||gggggggg|to|gggggggg||g------||gggggggg||gggggggg||. . .
```

One should note that extra transmitter equipment might be necessary to ensure that the f carrier is always transmitting for the subscribers evaluating handover candidacy even when there is no user traffic to put there. In GSM/PEDC, dummy bursts are defined for this purpose. Furthermore, it should be noted that transmitter equipment must be capable of changing frequency on a slot-to-slot basis as opposed to the foregoing discussion which did not include the dedicated carrier and the implied impact upon frame-to-frame hopping capability.

Using this scheme, there are certain instances where a distant cellular subscriber could experience interference due to differential transmission delays. Assume that both cell sites are synchronized ($t_O$) and share the same hopping pool, as above.

Figure 2:
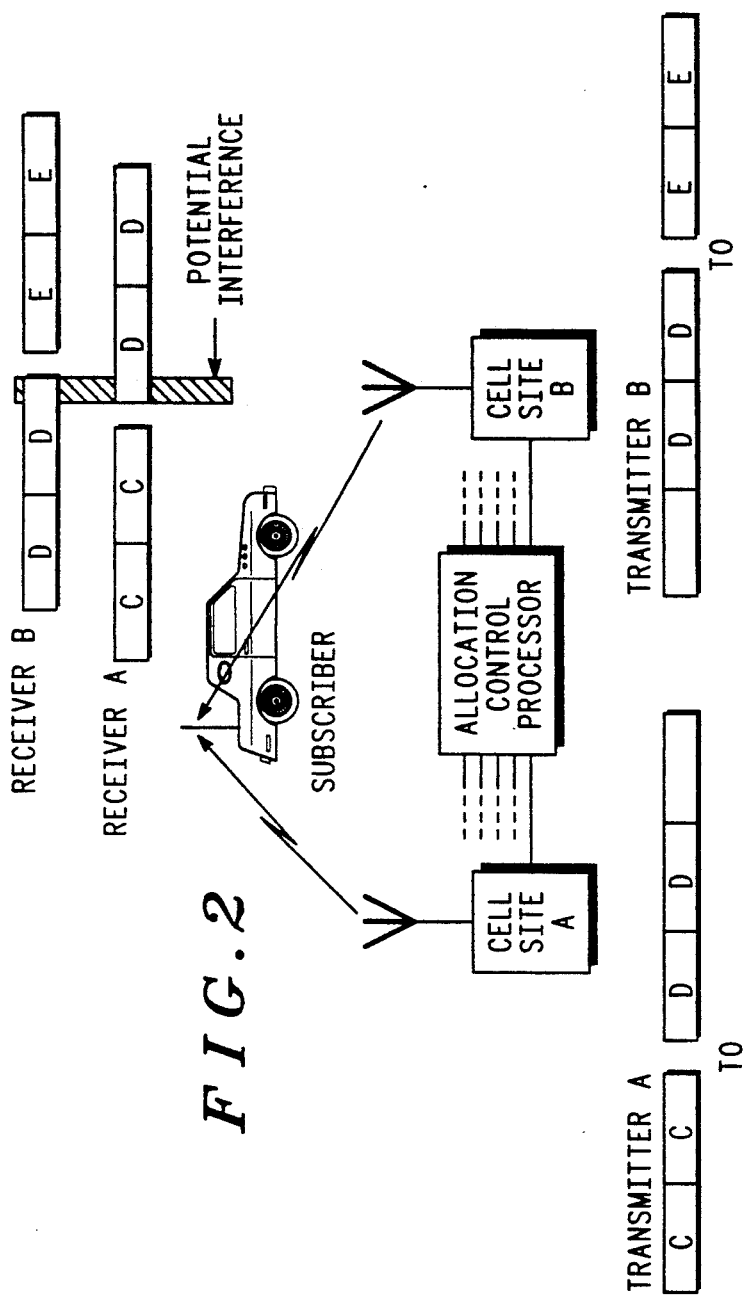
FIG. 2 illustrates the near/far problem solved by the instant invention.
Figure 3:
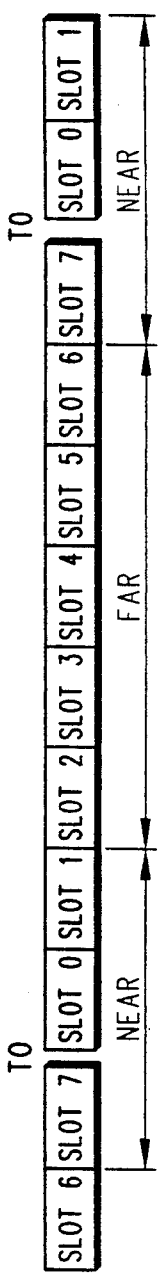
FIG. 3 illustrates timeslot allocation according to the preferred embodiment of the instant invention.

FIG. 2 illustrates the near/far problem solved by the instant invention. When a subscriber is relatively far from cell sites in his area, but somewhat closer to one (A) than the other (B), at frame boundaries (when the frequencies change), with limited guard time between slots, he might experience interference from the tail of one (B) overlapping with the the beginning of the other (A). The farther out the subscriber, the more likely (and severe) the overlap. FIG. 3 illustrates timeslot allocation according to the preferred embodiment of the instant invention. The solution to this potential complication of frequency hopping is not to allocate those time slots nearest the frame boundary to distant subscribers, but allocate them instead to those subscribers nearer the site (as measured by timing advance, for example). If frequency hopping takes place on a frame basis, such that frequency changes occur only from Slot 7 to Slot 0 (and Slot 0 to Slot 1 in the case of the dedicated control carrier), previous Slot 7 and subsequent Slot 0 on either side of the frame boundary (and Slot 1 of carrier f/g) would be allocated to nearer subscribers, while Slots 2-6 would be allocated to more distant subscribers. With this allocation of time slots, the near/far problem is substantially reduced. A reciprocal near/far problem in the subscriber-to-cell-site direction is solved with the very same strategy.

The circular queue means (or deterministic algorithm means) for time-synchronously allocating carriers pointers in the fashion described is well within the capability of one ordinarily skilled with cellular base station control methodologies employed within the Allocation Control Processor of FIG. 2.

Thus, in a TDMA cellular network, there has been provided a mechanism for shared-carrier frequency-hopping. It comprises: allocating on a frame basis within a reuse diameter to one coverage area during certain timeslot(s) at least one from a pool of TDM-frame-hopped carriers and allocating on a frame basis within that carrier reuse diameter to another coverage area during certain other, substantially non-overlapping timeslot(s) that frame-hopped carrier, all in substantially non-interfering time-synchronism with any proximal reuse of that carrier, whereby the advantages fo frequency hopping are obtained. Stated differently, it comprises: at one instant in time, allocating within a reuse diameter to one coverage area at least one of a plurality of hopped carriers and at that same instant in time, allocating within that carrier reuse diameter to another coverage area another of that plurality of hopped carriers, all in time-synchronism with any proximal reuse of that carrier. The control and access carriers may also be included in the hopping pool, causing certain timeslots to be hopped on a sequence different from the others. The pool of hopped carriers is further apportioned among co-located sites into hopping groups, thereby reducing intra-system synchronization requirements. To solve the near/far problem, TDM timeslots bordering hopping boundaries are preferentially allocated to less distant mobile users.

The attendant advantages of this invention include the provision of a far larger hopping pool from a smaller number of carriers, permitting hopping to be offered as a system enhancement at all in these circumstances; utilization of the access and control carrier in the hopping sequence; improved C/I and fading performance; reduced dependence on intra-system synchronization; and solution of the near/far problem.

While the preferred embodiment of the invention has been described and shown, it will be appreciated by those skilled in this field that other variations and modifications of this invention may be implemented. Although the discussion of the preferred embodiment has been in terms of a sectored reuse, there is no reason that the concept need be so limited; it is equally applicable to omni-directional antenna Frequency-Division, Multiple Access (FDMA), for example. Similarly, there is no reason that the invention be limited to TDMA.

These and all other variations and adaptations are expected to fall within the ambit of the appended claims.

What we claim and desire to secure by Letters Patent is:

1. A method of shared-carrier frequency-hopping comprising:
   allocating to a first coverage area within a carrier reuse diameter, during a first time interval, a first carrier of a plurality of hopped carriers; and
   allocating within said carrier reuse diameter to a second coverage area, during a second time interval, said first carrier.

2. A method of shared-carrier frequency-hopping comprising:
   regularly allocating to a first coverage area within a carrier reuse diameter, during a first time interval, one carrier from a pool of hopped carriers; and
   regularly allocating within said carrier reuse diameter to a second coverage area, during a second time interval, said first carrier,
   whereby the advantages of frequency hopping are obtained.

3. A method of shared-carrier frequency-hopping comprising:
   allocating to a first coverage area on a frame basis within a carrier reuse diameter, during a first TDM timeslot, a first TDM-frame-hopped carrier from a pool of TDM-frame-hopped carriers; and
   allocating on a frame basis within said carrier reuse diameter to a second coverage area, during a second TDM timeslot, said first TDM-frame-hopped carrier,
   whereby the advantages of frequency hopping are obtained.

4. A method as claimed in claim 2 above, wherein control and access carriers comprise part of the pool of hopped carriers.

5. A method as claimed in claim 2 above, wherein certain time intervals of control and access carriers are hopped on a sequence different from the others.

6. A method as claimed in claim 2 above, wherein the pool of hopped carriers is apportioned among co-located sites into hopping groups.

7. A method as claimed in claim 2 above, wherein the number of carriers per coverage area made available for hopping through pooling exceeds the number that would be available per coverage area if allocated fixedly to that coverage area.

8. A method as claimed in claim 2 above, wherein hopping carriers over fixed carriers are preferentially allocated to those mobile users experiencing deteriorating signal conditions.

9. A method as claimed in claim 3 above, wherein at least one TDM timeslot not bordering hopping boundaries is preferentially allocated to distant mobile users.

10. A method as claimed in claim 3 above, wherein TDM timeslots bordering hopping boundaries are preferentially allocated to less distant mobile users.

11. A method as claimed in claim 3 above, wherein TDM timeslots bordering TDM frame boundaries are preferentially allocated to less distant mobile users.

12. A method as claimed in claim 3 above, wherein certain timeslots of control and access carriers are hopped on a sequence different from the others.

13. An apparatus for shared-carrier frequency-hopping comprising:
means for allocating to a first coverage area within a carrier reuse diameter, during a first time interval, a first of a plurality of hopped carriers operatively coupled with
means for allocating within said carrier reuse diameter to a second coverage area, during a second time interval, said first carrier.

14. An apparatus for shared-carrier frequency-hopping comprising:
means for regularly allocating to a first coverage area within a carrier reuse diameter, during a first time interval, one carrier from a pool of hopped carriers operatively coupled with
means for regularly allocating within said carrier reuse diameter to a second coverage area, during a second time interval, said first carrier,
whereby the advantages of frequency hopping are obtained.

15. An apparatus for shared-carrier frequency-hopping comprising:
means for allocating to a first coverage area on a frame basis within a reuse diameter, during a first TDM timeslot, a first TDM-frame-hopped carrier from a pool of TDM-frame-hopped carriers operatively coupled with
means for allocating on a frame basis within said carrier reuse diameter to a second coverage area, during a second TDM timeslot, said first TDM-frame-hopped carrier,
whereby the advantages of frequency hopping are obtained.

16. An apparatus as claimed in claim 14 above, wherein certain time intervals of control and access carriers comprise part of the pool of hopped carriers.

17. An apparatus as claimed in claim 14 above, wherein pooled control and access carriers are hopped on a sequence different from the others.

18. An apparatus as claimed in claim 14 above, wherein the pool of hopped carriers is apportioned among co-located sites into hopping groups.

19. An apparatus as claimed in claim 14 above, wherein the number of carriers per coverage area made available for hopping through pooling exceeds the number that would be available per coverage area if allocated fixedly to that coverage area.

20. An apparatus as claimed in claim 15 above, wherein at least one TDM timeslot not bordering hopping boundaries is preferentially allocated to distant mobile users.

21. An apparatus as claimed in claim 15 above, wherein TDM timeslots bordering hopping boundaries are preferentially allocated to less distant mobile users.

22. An apparatus as claimed in claim 15 above, wherein TDM timeslots bordering TDM frame boundaries are preferentially allocated to less distant mobile users.

* * * * *

UNITED STATES PATENT AND TRADEMARK OFFICE
CERTIFICATE OF CORRECTION

PATENT NO. : 5,301,188
DATED : April 5, 1994
INVENTOR(S) : Michael D. Kotzin, et. al.

It is certified that error appears in the above-indentified patent and that said Letters Patent is hereby corrected as shown below:

Title page, under item [73], Notice, insert -- October 26, 2010--.

Signed and Sealed this

Ninth Day of August, 1994

Attest:

BRUCE LEHMAN

*Attesting Officer*     *Commissioner of Patents and Trademarks*